(12) United States Patent
Singh et al.

(10) Patent No.: US 11,064,252 B1
(45) Date of Patent: Jul. 13, 2021

(54) SERVICE, SYSTEM, AND COMPUTER-READABLE MEDIA FOR GENERATING AND DISTRIBUTING DATA- AND INSIGHT-DRIVEN STORIES THAT ARE SIMULTANEOUSLY PLAYABLE LIKE VIDEOS AND EXPLORABLE LIKE DASHBOARDS

(71) Applicants: Dickey B. Singh, San Carlos, CA (US); Daljeet Virdi, San Francisco, CA (US)

(72) Inventors: Dickey B. Singh, San Carlos, CA (US); Daljeet Virdi, San Francisco, CA (US)

( * ) Notice: Subject to any disclaimer, the term of this patent is extended or adjusted under 35 U.S.C. 154(b) by 0 days.

(21) Appl. No.: 16/877,418

(22) Filed: May 18, 2020

Related U.S. Application Data (60) Provisional application No. 62/848,712, filed on May 16, 2019.

(51) Int. Cl.
*H04N 21/442* (2011.01)
*H04N 21/431* (2011.01)
*H04N 21/84* (2011.01)
*H04N 21/6587* (2011.01)

(52) U.S. Cl.
CPC ... *H04N 21/44218* (2013.01); *H04N 21/4316* (2013.01); *H04N 21/6587* (2013.01); *H04N 21/84* (2013.01)

(58) Field of Classification Search
CPC ............. H04N 21/44218; H04N 21/84; H04N 21/4316; H04N 21/6587; H04N 21/8541; A63F 2300/632; G06F 16/38; G06F 16/34; G06F 16/93; G06F 16/2428; G06F 16/26; G06F 16/252; G06Q 50/01; G06Q 10/10

See application file for complete search history.

(56) References Cited

U.S. PATENT DOCUMENTS

| | | | | |
|---|---|---|---|---|
| 10,419,817 | B2* | 9/2019 | Fishman | H04N 21/4826 |
| 10,839,000 | B2* | 11/2020 | Bahrie | G06F 16/38 |
| 2002/0194589 | A1* | 12/2002 | Cristofalo | H04N 21/23608 725/32 |
| 2004/0032486 | A1* | 2/2004 | Shusman | H04N 7/17318 348/14.09 |
| 2004/0210947 | A1* | 10/2004 | Shusman | H04N 21/44222 725/136 |
| 2006/0064733 | A1* | 3/2006 | Norton | H04N 21/8545 725/135 |

(Continued)

OTHER PUBLICATIONS

Ilo Alexandre, Promoting insight: A Case Study of How to Incorporate Interaction in Existing Data Visualizations, 2016, 2016 20th International Conference Information Visualisation pp. 203-208 (Year: 2016).*

(Continued)

*Primary Examiner* — Fernando Alcon
(74) *Attorney, Agent, or Firm* — Richard Eldredge; Brandon Leavitt (57) ABSTRACT

A service, system, and computer-readable media to create and distribute stories generated from data and insights, that are simultaneously played like videos and can be explored like dashboards and interactive charts. Such generative stories or casts are personalized to individuals and distributed using various push mechanisms including podcast-like and video cast-like distribution channels "storycasts" to deliver stories or casts to subscribed users.

11 Claims, 6 Drawing Sheets

(56) References Cited

U.S. PATENT DOCUMENTS

| | | | | |
|---|---|---|---|---|
| 2010/0079460 | A1* | 4/2010 | Breeds | G06F 16/9024 345/440 |
| 2011/0202562 | A1* | 8/2011 | Bloch | G11B 27/34 707/776 |
| 2011/0261049 | A1* | 10/2011 | Cardno | G06Q 10/10 345/419 |
| 2012/0179809 | A1* | 7/2012 | Barsness | G06F 16/24568 709/224 |
| 2012/0197992 | A1* | 8/2012 | Meyer | H04N 21/8541 709/204 |
| 2012/0233347 | A1* | 9/2012 | Lee | G06F 16/40 709/231 |
| 2014/0324717 | A1* | 10/2014 | Ayers | G06Q 50/01 705/319 |
| 2015/0134415 | A1* | 5/2015 | Grossman | G06Q 30/0203 705/7.32 |
| 2016/0155001 | A1* | 6/2016 | Betley | H04N 21/23424 725/116 |
| 2016/0234566 | A1* | 8/2016 | Suoknuuti | H04N 21/4307 |
| 2016/0295248 | A1* | 10/2016 | Carney Landow | H04N 21/4532 |
| 2016/0373795 | A1* | 12/2016 | Stefanoski | H04N 21/2393 |
| 2017/0155971 | A1* | 6/2017 | Vaculin | G11B 27/105 |
| 2017/0245023 | A1* | 8/2017 | Brelis | H04N 21/482 |
| 2017/0257671 | A1* | 9/2017 | Yerli | H04N 21/8541 |
| 2017/0346863 | A1* | 11/2017 | Faulkner | H04L 65/4015 |
| 2018/0001903 | A1* | 1/2018 | Nagy | B60W 30/09 |
| 2018/0255335 | A1* | 9/2018 | George | H04N 21/44222 |
| 2019/0005424 | A1* | 1/2019 | Gonguet | G06Q 10/0637 |
| 2019/0227989 | A1* | 7/2019 | Keel | G06F 16/9536 |
| 2019/0273972 | A1* | 9/2019 | Soderbergh | H04N 21/8545 |
| 2019/0373330 | A1* | 12/2019 | Bloch | H04N 21/25891 |
| 2020/0037048 | A1* | 1/2020 | Cheung | H04N 21/8545 |

OTHER PUBLICATIONS

Pavel et al., Lifestyle Stories: Correlating User Information through a Story-Inspired Paradigm, 2013 7th International Conference on Pervasive Computing Technologies for Healthcare and Workshops pp. 412-415 (Year: 2013).*

Lee et al., More Than Telling a Story: Transforming Data into Visually Shared Stories, 2015 IEEE Computer Graphics and Applications ( vol. 35, Issue: 5, Sep.-Oct. 2015) pp. 84-90 (Year: 2015).*

Emmanuel Akhigbe, A Beginner's Guide to D3.js, May 28, 2019, https://medium.com/better-programming/a-beginners-guide-to-d3-js-962a3234f76, (Year: 2019).*

* cited by examiner

SERVICE, SYSTEM, AND COMPUTER-READABLE MEDIA FOR GENERATING AND DISTRIBUTING DATA- AND INSIGHT-DRIVEN STORIES THAT ARE SIMULTANEOUSLY PLAYABLE LIKE VIDEOS AND EXPLORABLE LIKE DASHBOARDS

BACKGROUND

1. Field of the Invention

The present invention relates generally to making key insights be more effective, understood, and to be used in decision making, and more specifically to distributable insight reports in a new story format which are differentiated from (a) commonly used formats like static PDF reports, emailed infographics, emailed HTML, etc., and (b) new formats like AMP for Email format. Further, an explorable story format is video-like but not limited by inadequacies of video and interactive video-based formats.

2. Description of Related Art

To make effective and timely decisions, businesses spend a fortune garnering and utilizing insights from operations, product or service development, marketing, sales, finance, and other areas of the business.

Inclusive businesses, for example, ones that include teams in decision making perform much higher than those where all decisions are made by the leadership team. Such businesses share insights with their teams. Insight audiences vary from analysts who work with data daily, to people with non-analytical roles who occasionally incorporate data into their work, to managers who are required to provide constant feedback and guidance to executives and decision makers, to CEOs answerable to the board.

Figure 1:
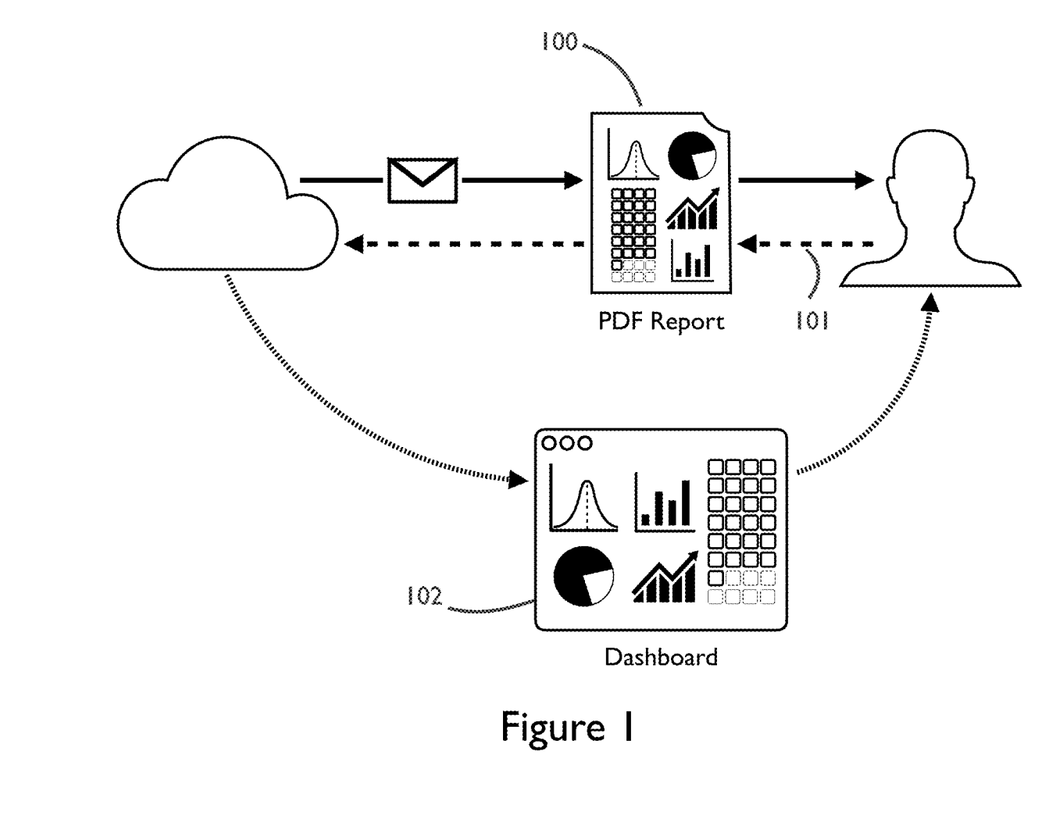
FIG. 1 shows how static reports delivered as PDFs or emails take users back to a dashboard.

Insights are available via dashboards or pushed to users as alerts, web or mobile push notifications, Slack integrations, and reports. Traditionally, insights pushed to users as reports are typically sent as static PDF reports 100 of varying size and detail, with optional likes 101 for users to bring them back to a dashboard 102, as depicted in FIG. 1.

A business may send such insights from: customer relationship management (CRM) products (e.g., Salesforce); analytics systems (e.g., Mixpanel); operations management systems (e.g., SAP); dashboard content aggregating tools (e.g., Domo); visualization tools (e.g., Qlik); Business Intelligence (BI) tools (e.g., Tableau); and numerous more products and services that typically deliver insights for the purpose of making informed decisions.

One of the problems commonly associated with this is that insights pushed to users via static reports are either too detailed leading to analysis paralysis or lack enough detail to be actionable. Further, raw insights are too cryptic for a majority of people who make day-to-day decisions and may not have time to look for meaningful insights in standard reports. Such reports do not engage users and therefore are not effective as mediums to promote insight-driven decision making.

Another problem commonly associated with this is that reports delivered in video format solve engagement problem to some degree but they do not solve the ability to research insights when needed. For example, a user receiving a video format report cannot click on a pie of a pie chart representing breakdown of quarterly product sales and see the weekly trend for the item the pie represents. Additionally, the requirement of pre-generating videos make video unsuitable for individualization and real-timeliness. Various other inadequacies of video (e.g., not supporting device orientations, lack of personalization, lack of customization, lack of branching, etc.) make videos ineffective for explorations.

Interactive video, a format popular in interactive explainer marketing videos uses video as underlying platform with super imposed HTML 5 forms. It solves basic branching and may be stretched to solve for customization and personalization. Interactive Video does not solve the ability to explore and therefore, is not suitable for reporting engaging insights.

Both video and interactive video are non-scalar or fixed pixel formats and cannot take advantage of or adapt seamlessly to various devices, resolutions and device orientations.

Furthermore, sequenced PowerPoint slides with animation, videos, and interactive videos as formats to deliver an engaging and self-playing experience proved inadequate to provide the engaging experience that was concise, simple, and playable like video, and explorable like dashboards at the same time, while connecting to a real-time back-end environment to fetch insights.

Accordingly, although great strides have been made in the area of business insight methods, many shortcomings remain.

SUMMARY

The objective of the service is to make esoteric insights—ones usually only understood by analysts and experts—available to, and effectively used by a much wider audience within a company, or groups that share similar interests.

The purpose of the story generated from data and insights is to simply describe and summarize key indicators, provoke thought, inspire action, and promote team-inclusiveness in decision making.

Such generated stories (i.e., casts) are concise, simple, insightful, intelligible, video-like an explorable like dashboards. They are video-like as they are self-playing similar to video, and they are dashboard-like as they can be fully explored and interacted with. They are different from both video and interactive video, as they are vector-based video, and therefore adaptable to screens, resolutions, orientations, and accessibility requirements. Concise stories, therefore, combine video's ease of content consumption to the ability of interactively exploring detail when needed.

In other words, generated stories (i.e., casts) can be thought of as self-playing interactive and natively explorable dashboards custom-created for individuals and pushed to users as storycasts.

Stories can be generated in a repeatable manner from templates, generated by a machine with human initiation, generated by machine with human assistance, generated by machine requiring human approval, or generated autonomously with varying-level of autonomy depending on content, context, and domain.

Generated stories (i.e., casts) can be watched, read and listened to. The StoryCast or Cast player can detect how a user is interacting with the device using a combination of a plurality of methods including, but not limited to, using camera facial detection, device auto-dimming status, application or player window background mode detection, and automatically changing the behavior of the player to accommodate interaction levels of reading and scrolling, watching and listening, listening only, or watching in muted mode with or without abilities. For instance, if a user is driving and not looking at a screen, the verbosity of narration can automatically be increased.

Generated stories (i.e., casts) can be exported into legacy formats like PDF, text, or other rich media formats. Generated stories (i.e., casts) can also be shared as video and audio formats.

Generated stories (i.e., casts) can be skipped forward and backward smartly. Forwarding or rewinding a generated story (i.e., cast) always starts from the beginning of a narration, sentence, chart or scene. Unlike audio and video, which more forward or backward in fixed increments (e.g., 10 seconds, 15 seconds or 30 seconds), a generated story (i.e., cast) does not start in the middle of a narration, sentence, chart or scene during forwarding or rewinding.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional business insight methods. Specifically, the invention of the present application allows for both high level reporting with sufficient detail available in a compelling method. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
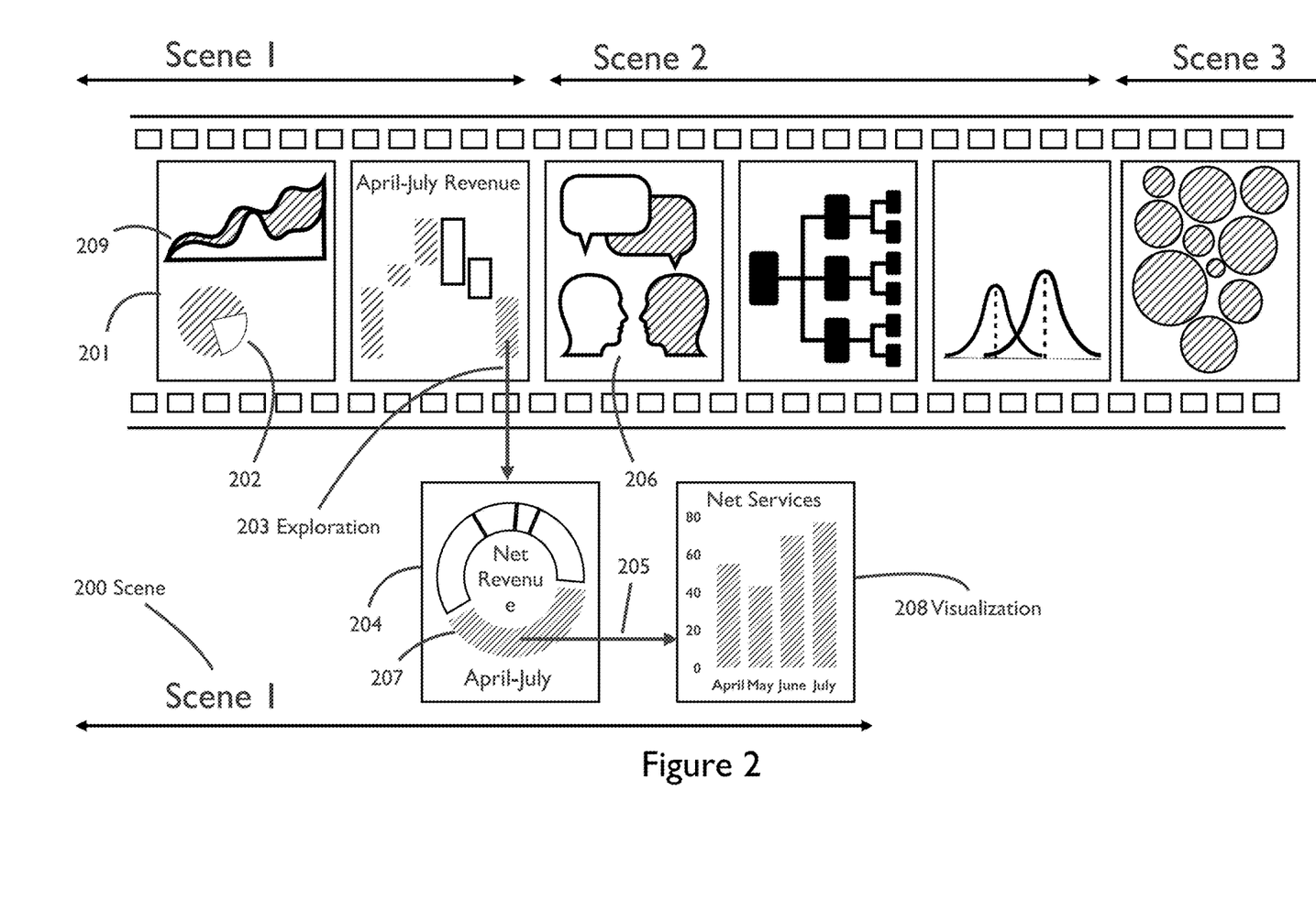
FIG. 2 shows how generated stories of the vector-video format are simultaneously video-like as they are self-playing and they are dashboard-like as they can be fully explored and interacted with wherein stories are made up of scenes, visualizations, and charts connected by sequence and branching logic.

Referring now to the drawings wherein like reference characters identify corresponding or similar elements throughout the several views, FIG. 2 depicts how generated stories of the vector-video format are simultaneously video-like as they are self-playing and they are dashboard-like as they can be fully explored and interacted with wherein stories are made up of scenes, visualizations, and charts connected by sequence and branching logic in accordance with a preferred embodiment of the present application. It will be appreciated that the invention of the present application overcomes one or more of the above-listed problems commonly associated with conventional business insight methods.

Figure 6:
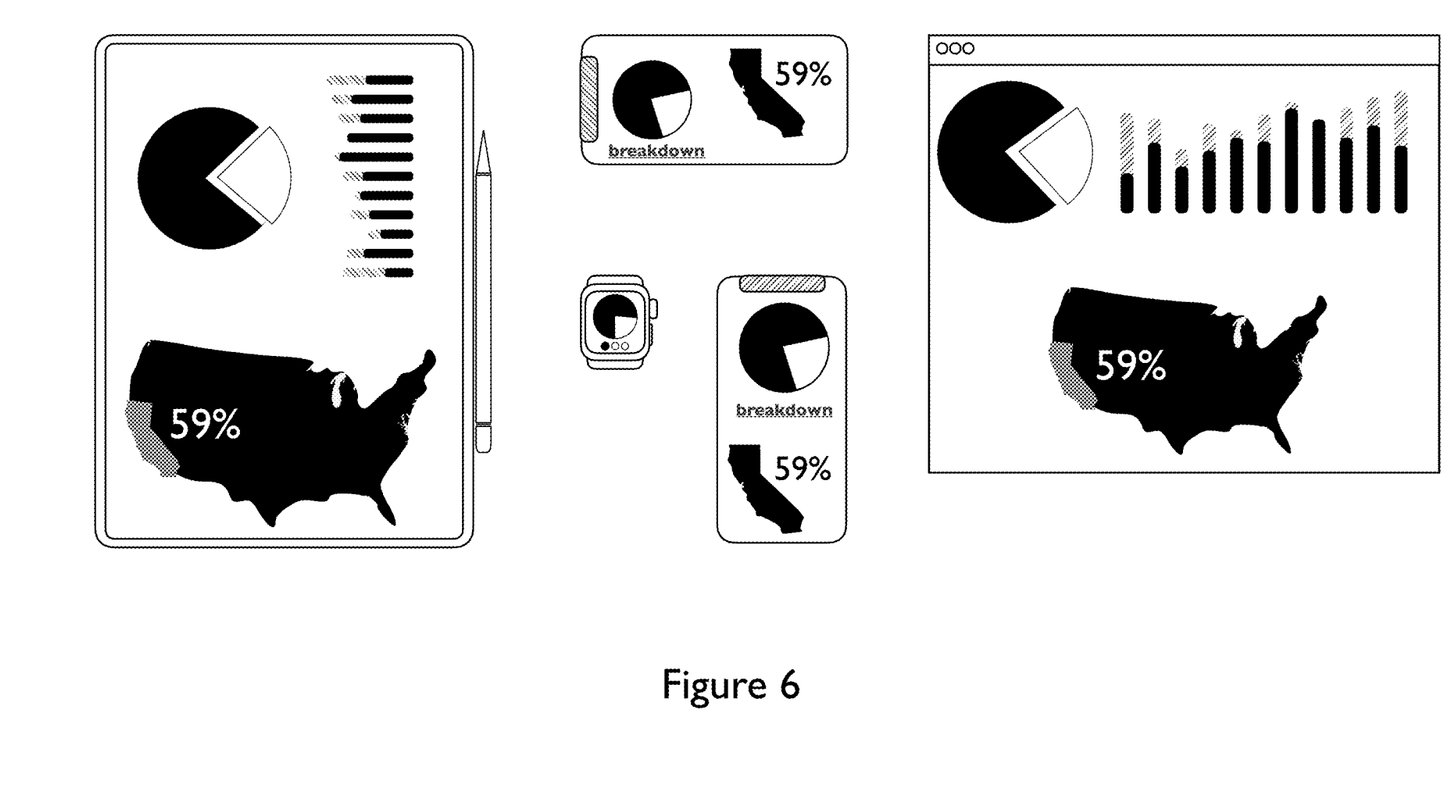
FIG. 6 shows the multiple size and orientations contemplated by the invention.

Data- and Insight-generated stories are concise, simple, insightful, intelligible, scalable, video-like, and simultaneously explorable like dashboards. Self-playing characteristics make them video-like, and the simultaneous ability to research underlying data, explore, perform what-if analysis (see 420, 421 in FIG. 4) make them dashboard-like. They are different from both video and interactive video as they are vector-based, and therefore adaptable to screens, resolutions, orientations (as shown in FIG. 6), and accessibility requirements, including but not limited to zooming, adapting for color blindness, and using high contrast colors rendering the system accessibility-supporting.

As depicted in FIG. 2, data- and Insight-generated stories, therefore, combine video's ease of content consumption to the ability of interactively exploring 203 detail when needed. For example, a user can click on a doughnut pie 207 to explore 205 to detailed chart 208.

Unlike standard video which is a lossy packaged sequence of bitmaps specifically created for a predetermined screen resolution (e.g., 1080p, 4K, etc.) and orientation (e.g., horizontal, vertical), the underlying format of a story at a high level consists of vector data, scripting code to draw graphics for various resolutions and orientations in a scalable and responsive manner, and metadata to access cloud resources pointing to configured data and insight sources.

Stories consist of a sequence of individualized scenes 200 that are generated from data and insights. Scenes 200 consist of one or more visualizations 201 and 204 shown either together, in sequence, or triggered based on a UI interaction 203 and 205. A visualization 201 may have one or more charts 202 and 209. Data- and insight-generated stories are conversational 206. For example, two people could explain the insights displayed and help highlight anomalies. Explanation and narrative content are generated based on data and insights.

Figure 3:
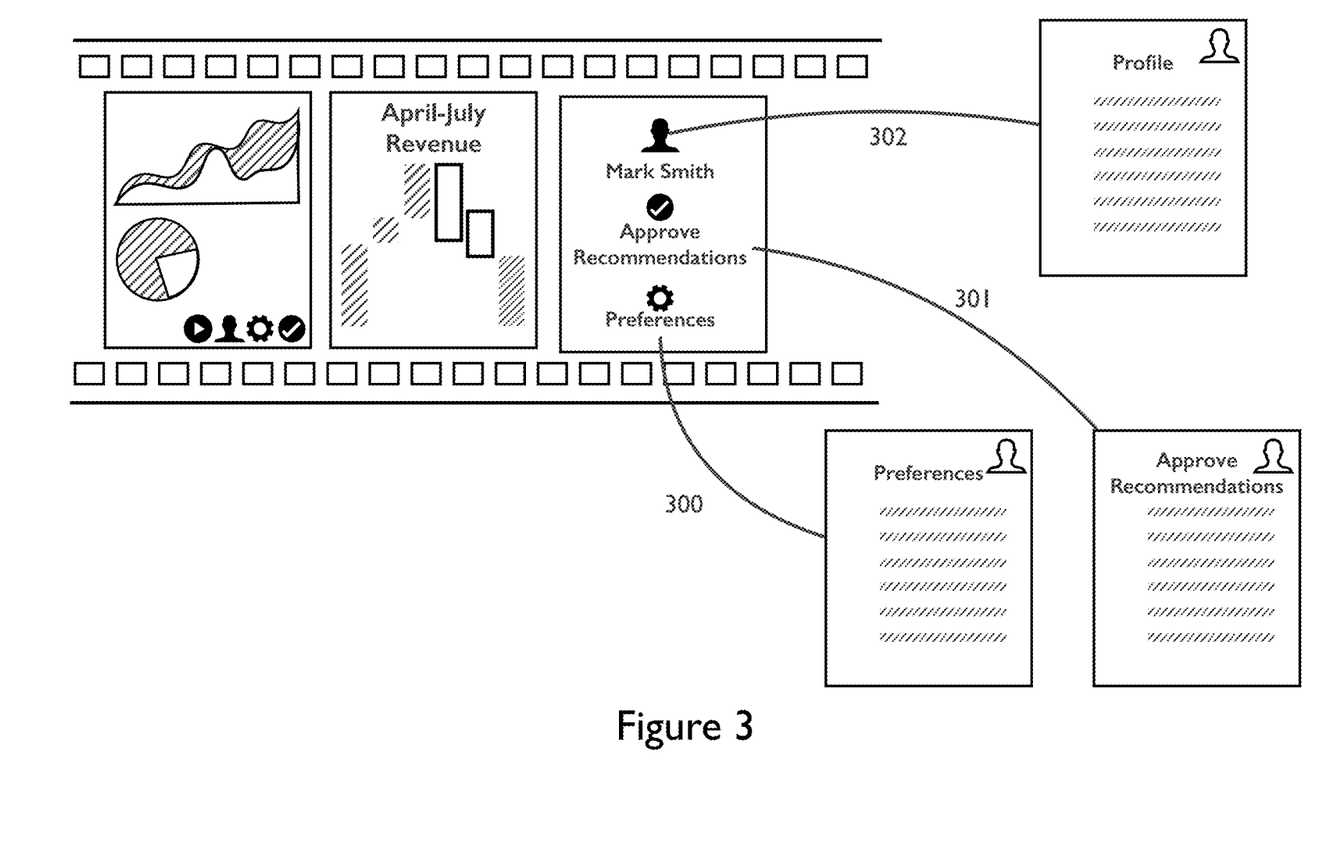
FIG. 3 shows how the user profile, preferences, and recommendations can be managed directly from the generative story.

FIG. 3 contemplates how the user profile, preferences, and recommendations can be managed directly from the generative story. Story scenes are individualized to users. They could be implicitly-inferred using personalization and explicit-selected based on user preferences 300.

Customizations are explicit choices or preferences. For example, a business may want to see sales number for only 5 of 20 products the company offers for sale and specify his or her preferences 300 directly in the delivered story.

Personalizations are generally implicit recommendations 301 based on behavior, usage, interests, interests of similar people, geography and a number of additional segmentation parameters derived from cohorts, demographics, technology usage, and survey or poll attitudinal data. For example, if 62% of store managers in San Francisco Bay Area compare their store sales with New York, Chicago and Los Angeles, a system could recommend the comparative store sales to the other 38% store managers.

Personalizations in a concise story needs to have a higher signal-to-noise ratio, earn trust, and be privacy-focused. All personalization-based inferences are transparent to users and require explicit permission for use. Users can allow, block, or augment automatic inferences shared as recommendations 301. In the comparative store sales example, a "Transparent Personalization System" could, in addition to be transparent regarding inferences, allow store sales managers to edit the recommendation of comparing with New York, Chicago and Los Angeles to comparing with New York, London and Paris.

Figure 4:
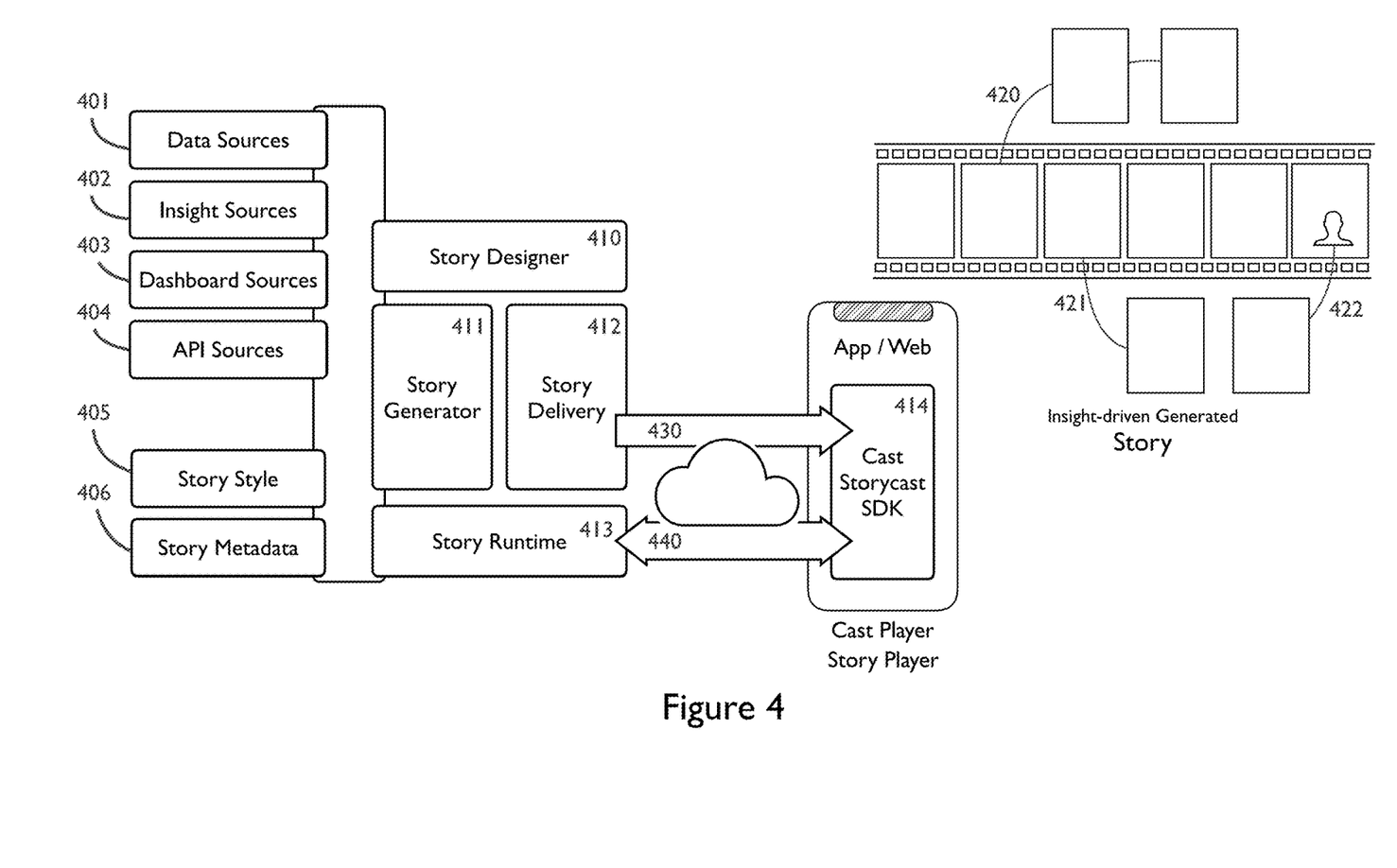
FIG. 4 shows how the story designer, story generator, story delivery and story runtime connect with other components including the storycast SDK or Player for apps and web.

FIG. 4 contemplates how the story designer, story generator, story delivery and story runtime connect with other components including the storycast SDK for apps and web. Stories are designed by users for users 410 using data sources 401, insight-sources 402, dashboard-sources 403, and API sources 404 and then saved as templates for use in story generation 411. A scene generator 411 generates scenes from data sources 401, insight-sources 402, dashboard-sources 403, and/or API sources 404 using a style described in the style 405 and rules in metadata 406. User profile, preferences, and approving inferences 422 can be accomplished directly from the story, either from a specific scene or from a menu bar on numerous scenes of the story.

A data- and insight-generated story consists of both delivered content and cloud content. Collectively, the content consists of list of scenes, playback sequence and branching rules, exploration rules, vector graphics, typescript or JavaScript code, embedded static data, cloud data sources to fetch dynamic data from, metadata, styling information, explicit-preferences, and approves personalization preference rules. The cloud component 440 through story runtime 413 connects to data sources 401, insight-sources 402, dashboard-sources 403, and/or API sources 404 to fetch content for dynamic vector-video based stories.

The method of designing a generative story includes selecting data sources 401, insight-sources 402, dashboard-sources 403, and/or API sources 404 to provide data for the story, using data sources 401 such as raw sources, insight-sources 402, processed data sources, preconfigured dashboard-sources 403, data that forms charts in a dashboard, API sources 404 and other services that expose data to populate the story, the system suggesting charts that match the sources, a user selecting charts of interest, placing the data, sources, charts and the like into groups to form visualizations, linking the visualizations together in sequence or by way of connections from exploration actions, and the user saving the selected and organized data as a template that is available during the story generation step.

The story generator 411 uses a pre-selected style, theme, optional template generated during the story design phase 410, or data from data sources specified in a template. The following are steps of an example of how a story is generated:

Step 1: The system reads the template, style, and any personalization data for story recipients.

Step 2: The system identifies charts and visualizations marked preload.

Step 3: The system fetches data for preload charts and visualizations.

Step 4: The system creates scenes corresponding to preload charts and visualizations.

Step 5: The system sends a push notification, email, text message, Slack message, or similar to the users, with scenes derived from preload scenes and visualizations.

Step 6: If the user clicks on notification, the system generates the non-preload visualizations and scenes and streams them as the users view the story, explore and/or interact with charts.

While the story is being played, the runtime collects behavioral usage and feeds it back via the story runtime to the system. The system collects, for instance, which notifications (e.g., push notification, email, text message, Slack message, etc.) were clicked; time spent on each visualization; explorations triggered; areas of charts users clicked on to determine where to provide future click triggers for explorations; paused, rewind, replay counts; and sections replayed. The behavioral data is combined with device technology usage and sent to the backend system. The backend uses the information to automatically enhance the templates which are reused to create future stories.

A story is delivered using a storycast, which is similar to how podcasts and video casts are delivered, i.e., to users who subscribe to them based on interest. The important difference being, storycasts are customized and personalized to users. Storycast is made available as a software development kit (SDK) for apps 414. Delivery mechanisms of stories vary from web push notifications, to mobile push notifications, to email, to Slack, etc. 430 in addition to subscription-based storycasts.

Stories are pushed to users on a schedule or when there is something interesting to share 430. For example, a user may receive a daily store sales story, a weekly marketing story, and highlights or anomalies as and when they are discovered.

User behavior in stories, i.e., explorations, what-if analysis is learned and may be incorporated in the next scheduled delivery of story to the same user. Feedback is delivered back 440 to story generator 411 via the story runtime 413.

Figure 5:
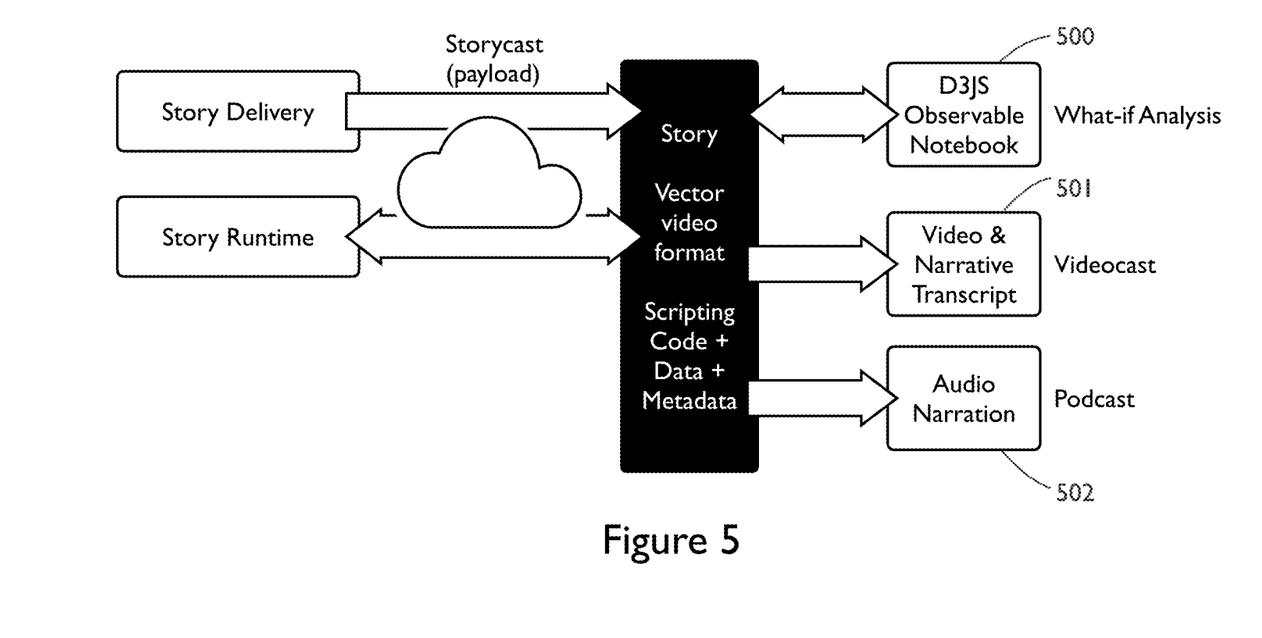
FIG. 5 shows the vector video format and how it can be exported into video cast friendly standard video with narrative transcript, exported into podcast friendly audio narration, and transformed into an Observable Notebook for what-if analysis.

FIG. 5 contemplates the vector video format and how it can be exported into video cast friendly standard video with narrative transcript, exported into podcast friendly audio narration, and transformed into an Observable Notebook for what-if analysis.

Interactive notebooks like Jupyter Notebook and D3Js Observable 500 based on Explorable Explanation technology help in creating interactive essays, visualizations with explanations, and also are suitable for what-if analysis. The underlying format can be transposed into a notebook format with key indicators exposed as adjustable parameters. This technique brings what-if analysis to the end users in businesses, helping improve the confidence-level in decisions. Edited notebooks can be transposed back into shareable stories.

The story format can also be exported into video cast friendly standard video with narrative transcript 501 and exported into podcast friendly audio narration 502, depending on content, context, and domain.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A business insight method system, comprising:
   a non-transitory computer readable medium having instructions stored thereon, which when executed by a processor, causes the processor to perform the operations of:
   designing story templates from data and insight sources, styles and meta data;
   generating stories or casts from data and insight periodically based on a defined schedule;
   delivering stories or casts to users; and
   a supporting run-time environment used for connecting with and fetching of data from a plurality of sources when users are viewing, interacting, configuring, providing preferences for, approving recommendations for stories, or a combination thereof,
   wherein a story generator generates stories based on an occurrence of an event including but not limited to detected anomalies or absolute and relative thresholds reached; and
   wherein the story generator generates a story in a format that can be exported to native audio format, native video format, an interactive notebook for visualizations, exploring data, and what-if analysis, including but not limited to D3JS Observable JavaScript Notebooks.

2. The system of claim 1, wherein a story or cast player can detect how a user is interacting with a device using a camera or other suitable facial detection, device auto-dimming status detection, application or player window in background mode detection, and automatically change the behavior of the player, including but not limited to increasing or decreasing the verbosity, to accommodate interaction levels of reading and scrolling, watching and listening, listening only or watching in muted mode with or without subtitles.

3. The system of claim 2, wherein the story or cast player can support smart forward and smart rewind where the story or cast player automatically forwards or rewinds to narration, sentence, chart or scene boundaries rather than automatically forwards or rewinds by fixed timing intervals.

4. The system of claim 1, wherein the story generator generates scenes, visualizations, charts, narratives, highlights, explanations, and explorations from data fetched from data sources as described in templates in the story designer phase.

5. The system of claim 1, wherein the story generator limits, arguments or modifies scenes, visualizations and charts generated based on user access rights and roles.

6. The system of claim 1, wherein the story generator incorporates user preferences, survey, poll attitudinal data, or a combination thereof when generating a story.

7. The system of claim 1, wherein the story generator incorporates inferences from behavioral, technology use, and usage data that are explicitly approved by the user in the collective context of transparent personalization.

8. The system of claim 1, wherein the story generator generates a story in a video-like, explorable, device agnostic, and device-orientation agnostic, accessibility-supporting format comprising:
   a script of code to draw vector elements adaptable to the device, resolution and orientation;
   scalable vector data; and
   metadata in assisting to fetch the right content for user from cloud-based data and insight sources.

9. The system of claim 1, wherein the story generator generates a story autonomously with or without the need for defining a template supporting varying levels of autonomy:
   generated by machine with human initiation; generated by machine with human assistance; generated by machine requiring human approval; and
   generated by machine autonomously with an autonomy level depending on context, content and domain.

10. The system of claim 1, wherein the business insight method system enables both explicit and implicit switching between consumption, exploration, editing preferences, data input, and approving personalization inferences modes.

11. A system comprising:
    a non-transitory computer readable medium of claim 1;
    wherein a story designer facilitates creation or editing of one or more scenes with each scene configured to fetch structured and unstructured data from one or more data, dashboard, insight, text, or API sources; with each scene supporting creation or editing of one or more visualizations consisting of charts; and with each visualization supporting a narrative to explain parts of story, with selective highlighting of elements of visualization during narration with tagged elements to trigger an exploration upon UI interaction.

\* \* \* \* \*